Aug. 19, 1930.  R. M. JACKSON  1,773,582
FUMIGATING APPARATUS AND METHOD OF FUMIGATING
Filed July 10, 1926
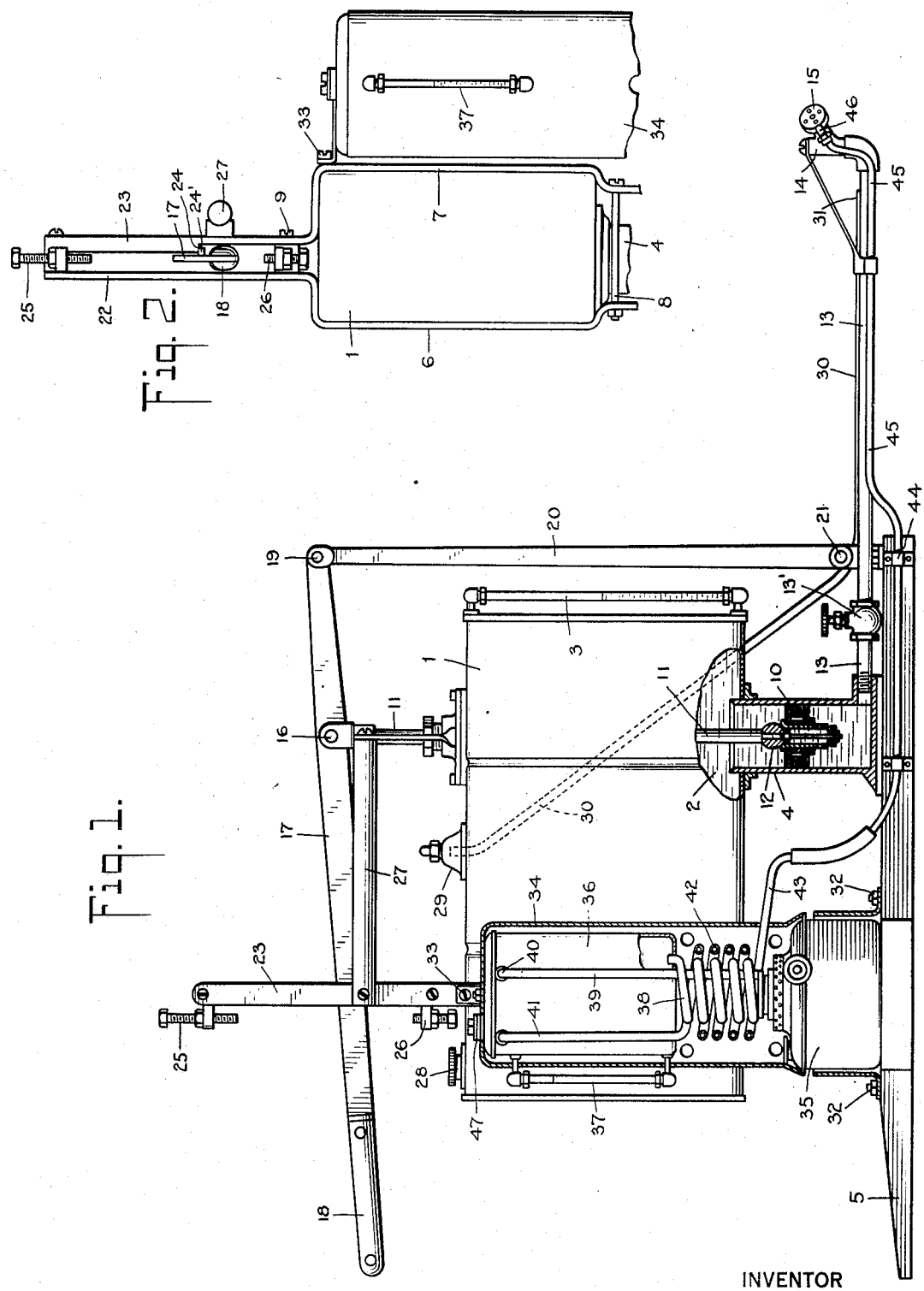
INVENTOR
Ralph M. Jackson
BY
*H. C. Bierman*
ATTORNEY Patented Aug. 19, 1930

1,773,582

UNITED STATES PATENT OFFICE

RALPH M. JACKSON, OF LA HABRA, CALIFORNIA, ASSIGNOR TO OWL FUMIGATING CORPORATION, OF NEW YORK, N. Y., A CORPORATION OF DELAWARE

FUMIGATING APPARATUS AND METHOD OF FUMIGATING

Application filed July 10, 1926. Serial No. 121,664.

This invention relates to fumigation, more particularly to an apparatus and a method of fumigating which is applicable to volatile liquid fumigants.

This application is a continuation in part of my pending application, Serial No. 688,308, filed Jan. 24th, 1924, for fumigating apparatus.

The present invention is directed specifically to the type of apparatus and method for fumigating described in my Patent No. 1,477,125, dated December 11th, 1923, for fumigating applicator. Apparatus of this kind finds extensive use in the fumigation of citrus trees wherein a tent or other cover is thrown over a tree to be fumigated and the applicator is so positioned that the nozzle thereof is under the tent. A predetermined measured amount of fumigant, which is generally liquid hydrocyanic acid, is forced through the nozzle of the applicator under the tent where the combined action of the pressure and temperature under the tent causes the atomized liquid to vaporize and to fill the space to be fumigated. Hydrocyanic acid is a liquid boiling at a temperature of about 80° F., and under normal conditions of fumigation, where the temperature is rather favorable, say 60° to 70° F., the hydrocyanic acid vaporizes rapidly and quickly diffuses throughout the space to be fumigated. However, if the temperature of fumigation is low, say between 35° and 45° F., as frequently occurs in the fall and winter seasons in California and Florida, the liquid hydrocyanic acid does not vaporize very rapidly and if the temperature is sufficiently low a large part thereof, after being atomized, drops to the ground and is lost, thus destroying the efficiency of the fumigation. Furthermore, this liquid may cause injury to the trees by coming in contact with the roots thereof. For this reason fumigation is not carried on extensively when the temperature becomes low, although even at this season of the year fumigation is desirable and necessary.

My invention is intended to obviate the difficulties of fumigating citrus trees at low temperatures, it being among the objects thereof to provide a method and an apparatus for fumigating which shall be effective at relatively low temperatures.

It is also among the objects of my invention to devise a method and an apparatus whereby liquid hydrocyanic acid or other volatile fumigant may be readily and completely gasified in an enclosure to be fumigated at temperatures materially below the boiling point of the fumigant.

In practicing my invention I may provide an apparatus of the character described in my above identified patent or any other suitable device wherein means are provided for accurately measuring predetermined doses of the liquid and ejecting the same through a nozzle under a tent or other enclosure to be fumigated. In conjunction with such an apparatus I provide means for heating the liquid, either as it passes through the same on its way to the nozzle or by heating the liquid after it has been atomized at the nozzle or both. Specifically, in order to accomplish this I provide a source of hot gases, preferably superheated steam, which is generated in a boiler or similar device constituting a part of the fumigating apparatus and I conduct the steam through a pipe which is substantially in contact with the pipe conducting the volatile liquid to the nozzle. I thereby heat the liquid to such an extent that when it is atomized there are sufficient heat units present to cause substantially total vaporization thereof. To further heat the atomized liquid and to prevent condensation thereof because of the low temperature in the enclosure, I inject the steam into the atomized mass of liquid, thereby imparting still more heat units and insuring that no condensation of the vapors takes place.

In the accompanying drawing constituting a part hereof and in which like reference characters indicate like parts:

Fig. 1 is a side elevational view of an apparatus embodying the subject matter of this invention, some of the parts thereof being shown in section and others being broken away for clearness; and Fig. 2 is a fragmentary, rear elevational view of the apparatus, showing particularly the relative positions of the receptacle for fumigant and the source of heat.

There is provided a tank 1 adapted to contain a fumigant 2, such as liquid hydrocyanic acid, and having a gauge glass 3 for indicating the amount of liquid in the receptacle. From the bottom of the receptacle 1 there extends a pump cylinder 4 which is secured to the base 5 of the apparatus, and which acts as one of the legs or supports for receptacle 1. Bands 6 and 7 of sheet metal surround the receptacle 1 at a point remote from the cylinder 4, the said bands being clamped around the receptacle at points 8 and 9. The lower ends thereof are secured to the base 5, not shown in the drawing, and they constitute the other leg or support for the receptacle.

Within the pump cylinder 4 is a piston 10 of suitable construction and a piston rod 11 of loosely connected thereto with lost motion, extends through the top of the receptacle 1 and a ball valve 12 is formed on the lower end of the piston rod 11. At the bottom of the cylinder 4 is a substantially horizontal pipe 13 controlled by a valve 13' and having a spring pressed check valve 14 near the outer end thereof and a spray nozzle 15 through which liquid is atomized. The upper end of piston rod 11 is pivoted at intermediate point 16 of horizontal lever 17 having an operating handle 18 on one end thereof. The opposite end of lever 17 is pivoted at point 19 to vertical lever 20, the lower end of which is pivoted to the base 5 at point 21. Extensions 22 and 23 of bands 6 and 7 enclose the lever 17 and a shoulder 24 formed on the extension 23 cooperates with a projection 24' fixed to lever 17. Adjustment screws 25 and 26 are provided at the upper and lower ends of the extensions and they constitute stops for the movement of lever 17. The apparatus is provided with a handle 27 for readily carrying the same from place to place and the receptacle 1 has a filler opening, closed by cap 28 and a dome 29 approximately in the center, from which there extends a vent pipe 30 to a point 31 near the nozzle 15. The vent pipe carries off any vapors generated in the receptacle 1 and discharges them at a point remote from the operator.

Secured to the base 5 at points 32 and to band 7 at point 33 is a boiler 34 having a burner 35 or other source of heat in the lower portion thereof. At the upper end is a tank 36 provided with a gauge glass 37 and adapted to hold water or other suitable liquid. A coil 38 connects with the lower end of tank 36 and is positioned so as to receive heat from burner 35, the lower end of the coil 38 being connected to pipe 39 which enters the tank 36 at the upper end 40 thereof. A pipe 41 extending downwardly from the upper end of tank 36, connects with a coil 42 surrounding coil 38 and is also adapted to be heated by the burner 35, the lower end of coil 42 being connected to pipe 43 which is clamped to the base 5 by clamps 44. A substantial portion 45 of the pipe 43 is placed alongside the pipe 13 for a major part of its length and is held substantially in contact therewith. The pipe 43 terminates at point 46 where the gases or vapors therefrom discharge into the atomized stream issuing from the nozzle 15. The tank 36 is provided with a filling opening, closed by a plug 47.

The operation of the device is as follows:

A tent is placed over a tree to be fumigated and the nozzle 15 with the parts associated therewith is placed under the tent. The burner 35 is lighted so as to generate steam in the apparatus. The relative distances between stops 25 and 26 and stops 24 and 26 are so proportioned that a stroke of lever 17 between stops 25 and 26 will deliver through the nozzle 15, say five units of fumigant, whereas a stroke of the lever 17 between stops 24 and 26 will deliver one unit of fumigant through the nozzle. By this means it becomes a very simple matter after the number of units which the tree may require is determined, to take a suitable number of strokes with the lever 17, thus actuating the piston rod 11. first in an upward direction to open the valve 12 and allow fumigant to flow into the lower part of pump cylinder 4. Downward pressure on the lever 17 forces the liquid through pipe 13 and nozzle 15, where it is atomized. At the same time the action of the burner heats water in coil 38 forming steam which passes through pipe 39 into the tank 36 from which it passes through pipe 41 into coil 42, where it is superheated to a suitable degree, after which it passes through pipe 43 and out through opening 46. Because of the close contact between portion 45 of pipe 43 and pipe 13 which carries the liquid fumigant under pressure, a considerable amount of heat is transferred to the liquid in pipe 13,—this being sufficient in many cases to insure complete volatilization of the fumigant after it passes through the nozzle 15. However, to make certain that under all conditions of temperature all the fumigant shall vaporize and remain in the gaseous state, the superheated steam is allowed to flow from the end 46 of pipe 43 and intimately mingle with the atomized liquid, thereby supplying heat units not only to the fumigant itself but also to the surrounding atmosphere, raising the temperature thereof sufficiently so that substantially no condensation of the fumigant takes place during the fumigating period.

By reason of my invention I am enabled to use an apparatus of the type described wherein a liquid fumigant is atomized into an enclosure under conditions of temperature which have hitherto rendered it impossible to utilize the same By this apparatus I may successfully fumigate citrus trees at a temperature as low as the freezing point with perfect results and without any injury to the trees because of the condensation thereon of the liquid used.

Although I have described my invention setting forth specifically a single embodiment thereof, it is to be understood that my invention is susceptible of numerous changes in the construction and operation of the various elements therein. For example, the position of the boiler on the apparatus may be changed as well as the size and shape thereof and it may be secured in a different manner to the apparatus. I may so arrange the same that the boiler and pipe 43 may be made readily detachable from the remainder of the apparatus and the apparatus without the attachment may be operated under ordinary conditions, and the attachment may be secured thereto for use in cold weather. The operation of the burner 35 and the emission of steam from pipe 43 may be controlled, either manually or automatically, and steam may be generated only when the apparatus is actually being used for the ejection of liquid therefrom. The pipe 45 may partially or completely surround the pipe 13 in order to more effectively impart the desired heat units thereto. The end 46 of pipe 43 may itself terminate in a nozzle or it may be combined with the nozzle 15 so as to discharge into and through the same. This device may be attached to different types of fumigating apparatus and I contemplate the use thereof, both in portable types of fumigating applicators and in machine drawn types. These and other changes may be made in my invention, the scope of which is defined in the claims appended hereto.

What I claim is:

1. A fumigating apparatus comprising a receptacle for a liquid fumigant, means for measuring predetermined amounts thereof, a pipe for conducting the same to an outlet, and a second pipe for heating fluid parallel and adjacent to said first mentioned pipe for heating the liquid, an atomizing nozzle at the end of said first pipe, said second pipe terminating at said nozzle.

2. A fumigating apparatus comprising a receptacle for a liquid fumigant, means for measuring predetermined amounts thereof, a pipe for conducting the same to an outlet, and a second pipe for heating fluid parallel and adjacent to said first mentioned pipe for heating the liquid, an atomizing nozzle at the end of said first pipe, said second pipe terminating at said nozzle and a source of heat for said second pipe, said source and second pipe being detachable without impairing the operativeness of the remainder of the apparatus.

In testimony whereof, I have hereunto subscribed my name this 28th day of June, 1926.

RALPH M. JACKSON.